United States Patent [19]

Miller et al.

[11] 4,226,895

[45] Oct. 7, 1980

[54] FLAVORED SPREADABLE EMULSION

[75] Inventors: Donald E. Miller, Strongsville; Charles E. Werstak, Medina, both of Ohio

[73] Assignee: SCM Corporation, New York, N.Y.

[21] Appl. No.: 8,521

[22] Filed: Feb. 1, 1979

Related U.S. Application Data

[63] Continuation-in-part of Ser. No. 930,037, Aug. 1, 1978, abandoned.

[51] Int. Cl.³ .............................................. A23L 1/09
[52] U.S. Cl. .................................. 426/658; 426/604; 426/613
[58] Field of Search ............... 426/602, 603, 604, 613, 426/658, 564, 570, 572

[56] References Cited

U.S. PATENT DOCUMENTS

| | | | |
|---|---|---|---|
| 3,057,734 | 10/1962 | Pader | 426/658 |
| 3,282,707 | 11/1966 | Topalian et al. | 426/658 |
| 3,362,833 | 1/1968 | Smith | 426/658 |
| 3,983,256 | 9/1976 | Norris | 426/94 |
| 4,107,343 | 8/1978 | Petricca | 426/564 |
| 4,146,652 | 3/1979 | Kahn et al. | 426/613 X |
| 4,152,466 | 5/1979 | Deretchin | 426/613 |

*Primary Examiner*—Robert A. Yoncoskie
*Attorney, Agent, or Firm*—Richard H. Thomas

[57] ABSTRACT

A non-pourable, flavored, spreadable emulsion comprising about 8 to about 15% of a high solids fat, the balance being water and sweetening agent with lesser amounts of stabilizing agent, emulsifier, and protein. The use of a high solids fat makes the emulsion temperature stable over a wide temperature range. The emulsion is particularly suitable as a spreadable syrup for such food products as pancakes and waffles, and becomes fluid at the usual temperatures of serving of such products.

9 Claims, No Drawings

FLAVORED SPREADABLE EMULSION

This application is a continuation-in-part of prior copending application Ser. No. 930,037, filed Aug. 1, 1978, now abandoned, entitled "Low-Fat Margarine Substitute" and assigned to assignee of the present application.

The present invention relates to flavored, spreadable toppings. The toppings are non-pourable or non-flowable with a normal consistency similar to that of a margarine or honey butter, and maintain such consistency over a wide temperature range, for instance from about 40° F. to about 110°n F. At temperatures above about 110° F., the emulsions of the present invention become more readily spreadable, preferably, however, with a consistency somewhat thicker than that of table syrup at elevated temperature, more like that of apple butter or jelly.

The present invention is particularly applicable to the preparation of a spreadable, maple syrup flavored topping and will be described with reference thereto, although it will be apparent to those skilled in the art that the present invention has other applications, for instance in the preparation of a spreadable honey. Having a firm non-pourable consistency at room temperature, over a wide temperature range, the maple syrup topping can readily be stored without refrigeration in a variety of containers and spooned or otherwise removed from the same for application to a pancake, waffle, or other such food product. At the elevated temperature of the food product (e.g., about 150° F.), the topping quickly becomes spreadable to the extent it can be made to cover the same. Preferably, however, the consistency is thicker than that of conventional syrup so that it remains on top of the pancake or waffle rather than being absorbed therein. It is understood that flavorings other than a maple flavoring, for instance a strawberry flavoring, are well within the scope of the present invention.

Advantages of the present invention are that the emulsion can be stored without refrigeration, requires no special packaging, and is easily removed from such packaging by a spoon, knife or the like. Another advantage of the present invention is that the emulsion contains a fat, so that the consumer does not have to apply a margarine or butter to the food product involved. Other advantages of the present invention will be apparent to those skilled in the art.

BACKGROUND OF THE INVENTION

Temperature stable emulsions are known in the art. Prior U.S. Pat. No. 4,107,343, obtained by Anthony V. Petricca and assigned to assignee of the present application, describes a whip topping oil-in-water emulsion containing about 20 to 30% fat, about 7 to 20% sweetener, about 0.5 to 2.5% dispersible protein, about 0.1 to about 0.75% thickener, about 0.1 to about 1.0% buffer and about 0.75 to about 2.5% emulsifier, the emulsifier comprising propylene glycol monostearate or hexaglycerol distearate in combination with mono proportions of ethoxylated sorbitan ester, sorbitan monostearate and lecithin. The fat preferably has a melting point of about 98.6° F. and is ostensibly hard in the range of 50°-70° F. This patent is not an anticipation of the present invention.

Prior U.S. Pat. No. 3,983,256 to Norris et al describes what is referred to as a plastic sugar syrup that is appreciably non-flowable during storage comprising 35 to 65% sucrose or other mono- or disaccharide, 8 to 45% water, about 10 to 40% of a hydrogenated fat said to be plastic between 70° F. and 100° F., 0.5 to 5% emulsifiers, specifically a mixture of monoglycerides and polysorbates, plus 0.5 to 5% flavor. Optionally, a gelling agent may be employed, which can be proteinaceous or non-proteinaceous, or a polysaccharide such as sodium carboxymethyl cellulose. The patent lists a number of proteinaceous and non-proteinaceous and polysaccharide gelling agents which can be used.

Here also the present invention is not anticipated. It is indicated in the patent that the topping requires refrigerator storage to remain plastic without being absorbed into a pancake or other such food product. The proposal of the patent is to market a combined, precooked, farinaceous food topping product adapted for microwave heating. When heated, the topping quickly melts and trickles down, over and around the pancake or other food product providing a familiar syrup consistency.

In prior application Ser. No. 930,037, there is disclosed a low-fat spread, in the form of an oil-in-water emulsion, suitable by way of example as an imitation margarine, containing about 20-40% low melting point fat, a thickening agent such as a blend of carboxymethyl cellulose, microcrystalline cellulose and sodium carboxymethyl cellulose, and an emulsifier. The fat preferably has a Wiley Melting Point between 75° F. and 106° F. and an SFI profile of less than about 7 at 92° F. and near zero at 100° F. By not relying upon the fat for emulsion stability, the emulsion being oil-in-water, it was found that more flexibility in selection of the fat was available permitting better duplication of the properties of margarine or butter. The disclosure of said prior application is incorporated by reference herein.

SUMMARY OF THE PRESENT INVENTION

The present invention resides in the discovery of a flavored spreadable emulsion which is in a stable plastic state at room temperature and remains substantially in that state over a wide temperature range; and further which when heated, for instance on a pancake or other such food product, becomes readily spreadable with a thinner consistency, but preferably retaining sufficient body to remain on top of the pancake or other food product without being absorbed therein.

The emulsion of the present invention contains as major ingredients about 8-15% high solids fat, water and sweetening agent; with less than about 10% of minor ingredients including a water dispersible stabilizer, emulsifier, a water dispersible protein and flavoring, the proportion of sweetening agent to water being in the range of about 3:1 to about 4:1. It is important that the fat of the present invention be a high solids fat preferably having a low lauric acid content. Suitable such fats are mostly derived from what are termed domestic oils such as soybean oil, cottonseed oil, corn oil, ground nut oil, sunflower oil and safflower oil. Other suitable oils are olive oil and palm oil. These oils characteristically have lauric acid contents of about 0.5 or less, as contrasted with typical lauric oils having lauric acid contents of about 45% or more. Thus the fats of the present invention preferably have a Wiley Melting Point in the range of about 90° F. to about 115° F., as determined by AOCS method Cc 2-38; and an approximate solid-fat index, as determined by AOCS method Cd 10-57, of:

| Temperature, °F. | Approximate Solid-Fat Index |
|---|---|
| 50 | 65 ± 10 |
| 92 | more than 18 |
| 100 | 11 max. |

A preferred fat useful in the composition of the present invention is Kaomel (trademark, SCM Corporation) having a Wiley Melting Point of 97°–101° F., an Iodine Value of about 59, and a solid-fat index as follows:

| Temperature, °F. | Approximate Solid-Fat Index |
|---|---|
| 50 | 72 |
| 70 | 63 |
| 80 | 55 |
| 92 | 25 |
| 100 | 5 max. |
| 110 | 0 |

This fat is derived from a blend of soybean and cottonseed oils as defined in U.S. Pat. No. 2,972,541 by Cochran et al., assigned to assignee of the present application. Another suitable fat for use in the emulsion of the present invention is Duromel (trademark SCM Corporation) having an Iodine Value of 61–65, a Wiley Melting Point of about 101°–105° F., and a solid-fat index of:

| Temperature, °F. | Approximate Solid-Fat Index |
|---|---|
| 50 | 59 |
| 70 | 46 |
| 80 | 39 |
| 92 | 19 |
| 100 | 6 max. |
| 110 | 0 |

Use of a lauric fat, defined as having a high lauric acid content ($C_{12}$), may result in an undesirable soapy off flavor during normal storage. Hydrogenation and elaidinization of domestic non-lauric fats provide a desired hardness or high solids content sufficient to maintain a substantially plastic consistency throughout a wide temperature range, and at the same time rapid melting at elevated temperature above about 110° F. without retention of a waxy mouth feel.

The sweetening agent employed in the composition of the present invention can be any of those conventionally used in the production of sweetened topping compositions. Preferably a substantial portion of the sweetener is corn syrup solids to add bulk to the spreadable emulsion, without excessive sweetness. One hundred percent of the sweetening agent can be corn syrup solids. One suitable corn syrup solid sweetener available on the market is Dry-Sweet 36, trademark, Hubbinger Company, having a D.E. of 36. Sucrose and dextrose may be employed in combination with corn syrup solids, for instance in the ratio up to about 3:1 of dry corn syrup solids to dextrose. Another suitable sweetening agent is maltodextrin consisting of a mixture of dextrose, maltose and dextrin. The ratio of corn syrup solids to dextrose or other sweetener is not critical except with regard to level of sweetness and bulk desired.

An example of the present invention is a formulation composed of maple flavored syrup with fat, water, stabilizer and emulsifier wherein the sweetening agent is derived from the maple flavored syrup. One suitable such syrup is Aunt Jemima Syrup (trademark, Quaker Oats Company) containing about 75% corn syrup, 21 sugar syrup, 2% maple sugar syrup, additional corn syrup solids, cellulose gum, artificial flavor, sodium benzoate and sorbic acid (preservatives), and caramel color. In a formulation employing such a syrup the added water content is adjusted to take into consideration the water content in the syrup. Most syrups are 70–80% solids. In the Aunt Jemima formulation, the corn syrup, sugar syrup and maple sugar syrup are each about 80% solids. These three compounds make up 98% of the formulation, providing an accumulative water content of about 20%.

A critical aspect is using the sweetening agent and water in the range of about 3:1–4:1. Above about 4:1 sweetening agent to water, sugar crystallization is apt to occur. Below about 3:1 sweetening agent to water, bacterial growth is possible.

The purpose of the stabilizing agent in the present invention is to offer bodying and water binding properties to the composition. A preferred stabilizing agent is Gelcarin HWG (trademark), a carrageenan gum manufactured by Marin Colloids, Inc. It is readily water dispersible and provides a desirable short grained non-stringy product. However, the use of other naturally occurring or synthetically produced polysaccharide gelling agents are within the broad scope of the present invention. Illustrative such polysaccharides include water dispersible cellulose derivatives such as sodium carboxymethyl cellulose; gum tragacanth; gum acacia; gum karaya; locust bean gum; cellulose ethers such as methyl cellulose; low methoxy pectin; propylene glycol alginate; sodium alginate; gelatinized starches and starch derivatives such as hydroxypropyl starch; Avicel RC 581 (trademark, FMC Corporation), a mixture of 89% cellulose gel (microcrystalline cellulose) and 11% cellulose gum (sodium carboxymethyl cellulose). Others are well known to those skilled in the art.

The formulation of the present invention also employs a normally (at room temperature) water dispersible or soluble protein such as sodium caseinate, soy protein, non-fat milk solids, whey solids, fish protein, calcium caseinate and cottonseed protein. Other suitable proteins are yeast proteins such as torula yeast, "Torutein-94" (trademark, Amoco Foods Company). Glutin, casein, and edible salts thereof, powdered wheat germ protein, bean flour, and bran protein are still additional examples of other proteinaceous agents which may be used in the present invention. The protein adheres to the fat globules and as with the emulsifiers assists in emulsion formation.

The emulsifying agent of the present invention preferably is a soft partial glycerol ester, as contrasted to a hard or fluid emulsifier, having a Capillary Melting Point (as determined by AOCS method Cc 1-25) below about 140° F., preferably in the range of about 110°–140° F. A soft emulsifier of plastic consistency gives the emulsion viscosity desired and maintains the fat in a dispersed form. One suitable such emulsifier is Dur-em 204 (trademark, SCM Corporation), a cream plastic mono- and diglyceride from hydrogenated vegetable oil having about 52% minimum alpha-monoglyceride, an IV of 65–75, and a Capillary Melting Point of about 120°–130° F. Also useful in the process of the present invention is a soft, 90%, alpha-monoglyceride such as Myverol 18-30 (trademark, Eastman Chemical Prod., Inc.), having a plastic consistency, a Congeal Point of about 136° F. (close to the Capillary Melting Point). A still softer partial glycerol ester such as Durem 114 (trademark, SCM Corporation), a mono- diglyceride having a Capillary Melting Point of 110°–120° F., is useful in the process of the present invention, but less of it should be used to avoid excessive viscosity. Also useful are emulsifiers such as Myverol 18–85 (trademark, Eastman Chemical Prod., Inc.), Congeal Point about 115° F.; and Myverol 18–98 (trademark, Eastman Chemical Prod., Inc.), a soft plastic alpha-monoglyceride having a Congeal Point of about 77° F. Here also, less of these emulsifiers would be employed to avoid excessive viscosities.

Other classes of emulsifiers can be employed in the process of the present invention such as propylene glycol ester emulsifiers, e.g. propylene glycol monostearate, HLB 2.2, an example being Durpro 107 (trademark, SCM Corporation) having a plastic consistency and a Capillary Melting Point of about 115°–125° F.; sorbitan esters such as sorbitan monostearate, HLB 4.7, one example being Durtan 60K (trademark, SCM Corporation), having a cream, bead consistency and a Capillary Melting Point of 121°–127° F.; and ethoxylated fatty acid esters such as ethoxylated mono- and diglyceride. Santelle EOM (trademark, SCM Corporation) is one such ethoxylated mono- and diglyceride, manufactured from a hydrogenated vegetable oil and having an acid value maximum of 2.0, a hydroxyl value of 60–80, an IV number based on fatty acid content of 3 maximum and an oxyethylene content of about 60.5–65.0%.

In the process of the present invention, the fat is employed in the range of about 8–15% by weight based on the total weight of the composition. The balance of the composition is principally water and sweetening agent, less than 10% of the composition comprising the minor ingredients such as emulsifier, gum, protein and flavor. The amount of emulsifier and gum used is determined by the amount of body and viscosity desired of the final product. Specific amounts can be readily determined by one skilled in the art. Preferably, the emulsifier is employed in the range of about 0.1–2%; the gum in the range of about 0.5–1.4%; and the protein in the proportion of about 0.8–1.0%, based on actual protein content. By way of example, skim milk solids contains about 35% protein so that when used in the range of about 2½%, it provides about 0.9% actual protein. The salt and other flavor components would be used in the proportion of about 0.3%, plus or minus, dependent upon taste. The gum content can be increased above 1.4% to give additional body, particularly if a hard partial glycerol ester, an ethoxylated mono- and diglyceride, propylene glycol or sorbitan ester is employed as the emulsifier, but too much gum could leave a gummy mouth feel with consumption of the product.

The present invention is illustrated in the following Example in which proportions are percentages by weight, unless otherwise specified, and temperatures are in degrees Fahrenheit.

EXAMPLE 1

In this example, the following formulation was employed:

| Ingredients | Proportions |
| --- | --- |
| Hydrogenated vegetable fat-Kaomel | 10.1 |
| Maple Flavored Syrup (Aunt Jemima Syrup, trademark, Quaker Oats Company) | 85.6 |
| Skim milk solids | 2.5 |
| Stabilizer (Gelcarin, trademark, Marine Colloids) | 0.4 |
| Emulsifier (Dur-em 204, mono- and diglyceride, trademark, SCM Corporation) | 1.4 |
| Total | 100.0 |

The entire amount of the protein (skim milk solids) and stabilizing agent (Gelcarin) is added to a melted mixture of the fat and mono- and diglyceride at about 130° F. Simultaneously the syrup is heated to about 130° F. Mixing then is carried out by adding the oil mix and syrup mix together and heating the same to about 160° F. The mixture is then homogenized at elevated temperature and cooled to room temperature. No refrigeration is necessary.

It will be recalled from above that the Aunt Jemima Syrup is more than 98% sweetening agents and water, in the ratio of about 4:1 sweetening agents to water. Thus the above formulation in effect contains about 69% sweetening agents and about 17% water. Roughly the same formulation could be prepared by adding the sweetening agents (e.g., a mixture of corn syrup solids and dextrose) and water separately.

The flavored spread is unlike jelly or jam in that it contains fat, so that no butter or margarine is required on toast, bread, English muffins, or the like to which the spread is applied. Also the solids are high in the syrup phase so that the oil-in-water emulsions of the present invention may be used as sundae toppings with freezing of the syrup. It is understood that the actual viscosity of the emulsion of the present invention, within limits, can be controlled by the amount of fat used, by the melting point of the fat, by the solid-fat index of the fat, by the type of emulsifier, by the amount of emulsifier, and by the amount of stabilizer employed.

Other conventional products containing sweetening agents, than syrup. such as honey, jelly, jam, and the like, can be employed. In each case, the formulation would be appropriately modified to take into account proportions of sweetening agent and water present, plus gums and emulsifiers in the product used.

What is claimed is:

1. A flavored, spreadable emulsion which is non-pourable over a wide temperature range including room temperature and which is readily spreadable at elevated temperatures above about 110° F. consisting essentially of, based on the total weight of the emulsion, about 8% to about 15% vegetable fat, water and sweetening agent, in the proportion of about 3–4:1 sweetening agent to water, a bodying amount of stabilizing agent, and emulsifying amounts of an oil-in-water emulsifier and water dispersible or soluble protein, the relative proportions of emulsifier and protein being those necessary to maintain said non-pourable but spreadable emulsion consistency, said stabilizing agent, emulsifier and protein in combination comprising less than about 10% by weight of the emulsion; said fat having a Wiley Melting Point in the range of about 90° to about 115° F., and an approximate solid-fat index of:

| Temperature, °F. | Approximate Solid-Fat Index |
|---|---|
| 50 | 65 ± 10 |
| 92 | more than 18 |
| 100 | 11 max. |

2. The emulsion of claim 1 wherein said fat has a low lauric acid content, at least a substantial portion of the sweetening agent being corn syrup solids.

3. The emulsion of claim 2 wherein table syrup provides at least a portion of the water and sweetening agent content.

4. The emulsion of claim 3 wherein said emulsifier is a mono- and diglyceride having a soft plastic consistency.

5. The emulsion of claim 4 wherein said stabilizing agent is a carrageenan gum.

6. A flavored, spreadable emulsion which is non-pourable over a wide temperature range including room temperature and which is readily spreadable at elevated temperatures above about 110° F. consisting essentially, based on the total weight of the emulsion, of about 8–15% hydrogenated vegetable fat, about 0.8–1% water dispersible or soluble protein defined as actual protein content, about 0.5–1.4% stabilizer, about 0.1–2% oil-in-water emulsifier and sweetening agent and water in the proportion of about 3–4:1 sweetening agent to water, at least a substantial portion of the sweetening agent being corn syrup solids, said hydrogenated vegetable fat being essentially non-lauric and having a Wiley Melting Point in the range of about 90° F. to about 115° and an approximate solid-fat index of:

| Temperature, °F. | Approximate Solid-Fat Index |
|---|---|
| 50 | 65 ± 10 |
| 92 | more than 18 |
| 100 | 11 max. |

7. The emulsion of claim 6 wherein said emulsifier is a mono- and diglyceride having a plastic consistency and a Capillary Melting Point less than about 140° F.

8. The emulsion of claim 6 wherein said emulsifier is selected from the group consisting of a soft partial glycerol ester; a propylene glycol ester; a sorbitan ester; and an ethoxylated mono- and diglyceride.

9. The emulsion of claim 8 wherein said stabilizer is carrageenan.

* * * * *